United States Patent [19]

Dorow

[11] Patent Number: 5,031,921
[45] Date of Patent: Jul. 16, 1991

[54] GLAND PRESSURE SEAL PLATE

[75] Inventor: James W. Dorow, Orlando, Fla.

[73] Assignee: Westinghouse Electric Corp., Pittsburgh, Pa.

[21] Appl. No.: 430,118

[22] Filed: Nov. 1, 1989

[51] Int. Cl.$^5$ .............................................. F16J 15/02
[52] U.S. Cl. ........................................ 277/1; 277/53; 277/236; 415/168.1
[58] Field of Search ................. 277/1, 3, 4, 32, 53, 277/131, 132, 187, 192, 236; 415/110, 111, 168.1, 168.2, 174.2, 170.1, 229, 230

[56] References Cited

U.S. PATENT DOCUMENTS

| 3,964,662 | 6/1976 | Ravicchio | 277/187 |
| 4,303,249 | 12/1981 | Illy | 277/236 X |
| 4,858,936 | 4/1989 | Adams | 277/187 |
| 4,913,447 | 4/1990 | Jostlein | 277/3 |

Primary Examiner—William A. Cuchlinski, Jr.
Assistant Examiner—Scott Cummings

[57] ABSTRACT

A steam turbine gland seal arrangement for use in a steam turbine which has at least one casing and a shaft extending through the casing so that steam may be admitted into the casing for operating on blades attached to the shaft for effecting rotation thereof. An inner gland and an outer gland are provided at one end of the shaft where the shaft exits the casing. Each of these glands support seals in close proximity with the shaft for preventing steam from escaping the casing. The inner gland is supported within an aperture in the casing where the shaft exits, and the outer gland is attached to an outer surface of the casing surrounding the aperture. The arrangement further includes an annular seal plate which circumscribes the turbine shaft and has an inner radial portion attached to an outer surface of the inner gland. An outer radial portion of the annular seal plate is cantilevered from the inner attached portion. The outer radial portion contacts an axially inner surface of the outer gland when this gland is attached to the casing. The outer gland exerts a deflecting pressure on the annular seal plate to provide a positive seal between the inner gland and the outer gland.

4 Claims, 2 Drawing Sheets

GLAND PRESSURE SEAL PLATE

BACKGROUND OF THE INVENTION

The present invention relates to steam turbines and, more particularly, to a sealing arrangement for preventing steam leakage into an area between inner and outer glands coupled to a steam turbine shaft.

Steam turbines generally includes a shaft to which is attached a plurality of stages of blading which react against steam introduced into the turbine to cause the shaft to rotate. The shaft and blading are located within a casing or cylinder which confines the steam. At each end of the casing where the shaft exits, there are provided seals in close proximity to the shaft for preventing steam leakage from the casing. The and for preventing air inleakage into the casing. The seals in proximity to the shaft are sometimes referred to as labyrinth seals and are supported in structural elements referred to as glands. An inner gland provides the first transition between the casing and the shaft and also between the steam environment inside the casing and the outside atmosphere. An outer gland supports a second labyrinth seal and provides a final transistion to atmosphere.

The inner gland is usually spaced radially from adjacent edges of the casing around the primary extent of the turbine shaft. However, both the inner and outer glands are normally formed in two circumferential arcs of approximately 180 degrees in extent and bolted together when installed on the turbine shaft. At the bolting points, the glands are attached to the casing so that they are not free to rotate. Over the remaining extent of the inner gland, there is provided an annular seal ring which isolates the space between the inner gland and casing from the interior of the turbine. In some high pressure (HP) steam turbines, superheated steam is introduced through an aperture in the casing into the space between the inner gland and casing and then through apertures in the inner gland into the area of the gland adjacent the turbine shaft. This cylinder end wall steam is used to minimize horizontal joint distortion by heating the casing or cylinder end wall and the inner gland. It is desirable to confine this superheated steam to the cylinder end wall and the inner gland area and not allow it to leak into the outer gland area.

In order to confine the cylinder end wall steam to the cylinder or casing end wall and the inner gland, there is provided an annular finger seal between the inner gland and the casing along the outside direction of the spacing therebetween. Thus annular finger seal lies in a pair of opposed grooves formed in the casing end wall and the inner gland. This finger seal has been found to be subject to erosion from condensation of the superheated steam resulting in undesirable leakage of the steam into the area between the inner and outer glands. Thus, it is desirable to provide a method and apparatus for preventing superheated steam leaking past the finger seal from getting into the area between the inner and outer glands.

SUMMARY OF THE INVENTION

The present invention is illustrated as a method and apparatus incorporated in a steam turbine gland seal arrangement for use in a steam turbine having at least one casing and a shaft extending through the casing. Steam is admitted into the casing for operating on blades attached to the shaft for effecting its rotation. An inner gland and an outer gland are provided at at least one end of the shaft where the shaft exits the casing with each of the inner and outer glands supporting labyrinth seals in close proximity with the shaft for preventing steam from escaping the casing by flow along the shaft. The inner gland is supported within an aperture in the casing where the shaft exits the casing and the outer gland is attached to an outer surface of the casing surrounding the aperture. An outer cylindrical surface of the inner gland is coaxial with and radially spaced from an inner surface of the casing circumscribing the aperture and an annular finger seal is positioned between the casing and the inner gland for preventing leakage of steam from the space between the inner gland and the casing onto the outer gland. The arrangement further includes an annular seal plate circumscribing the turbine shaft and having an inner radial portion sealingly attached to an outer surface of the inner gland, an outer radial portion of the annular seal plate being cantilevered from the inner attached portion and the outer radial portion extending into contact with an axially inner surface of the outer gland when the outer gland is attached to the casing. The outer gland exerts a deflecting pressure on the annular seal plate for providing a positive seal between the inner gland and the outer gland. The annular seal plate is formed as two partial arcs, the arcs mating at their respective ends to each other and being joined one to the other after attachment to the inner gland by welding at the mating ends. The outer gland has an annular shoulder adjacent its arc of attachment to the casing and the annular seal plate contacts the outer gland along the annular shoulder. The annular seal plate is preferably formed from stainless steel.

BRIEF DESCRIPTION OF THE DRAWINGS

For a better understanding of the present invention reference may be had to the following detailed description taken in conjunction with the accompanying drawings in which:

FIG. 3 is an enlarged view of a portion of the area of FIG. 1 showing the finger seal.

DETAILED DESCRIPTION OF THE INVENTION

Figure 1:
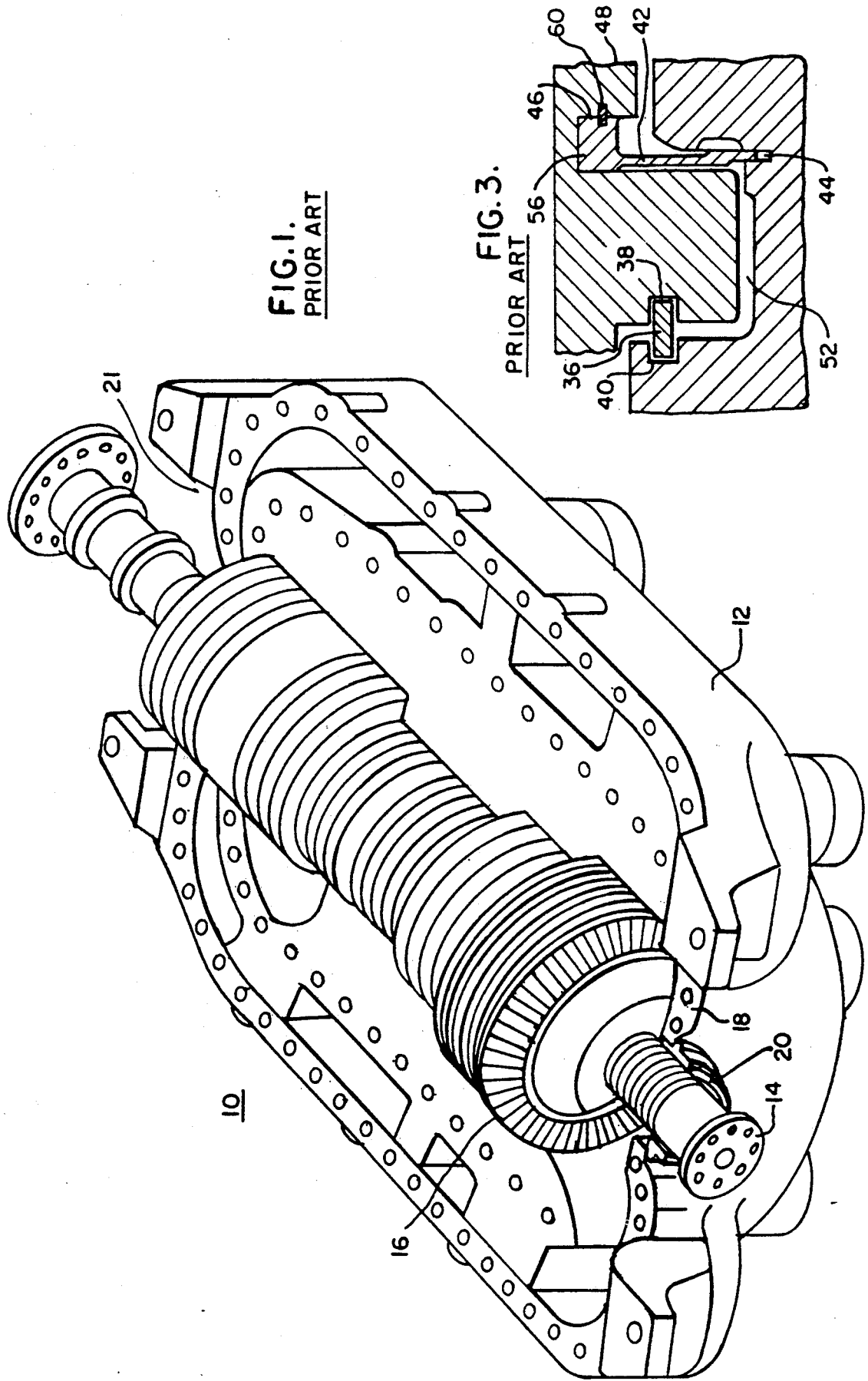
FIG. 1 is a simplified illustration of a steam turbine high pressure section showing the turbine shaft and the location of the inner and outer glands.

Referring to FIG. 1, there is shown a simplified view of one form of high pressure stage of a steam turbine 10 with the upper half of the cylinder or casing removed. The turbine includes a lower half casing 12 in which there is supported a turbine shaft 14. A plurality of blading stages 16 are attached to the shaft 14 and react to steam introduced into the casing to effect rotation of the shaft. At each end of the cylinder or casing 12 there are located an inner gland 18 and an outer gland 20 in an aperture 21 in casing 12. The glands 18, 20 support a plurality of labyrinth seals which prevent steam leakage along the shaft 14 from within the casing 12.

Figure 2:
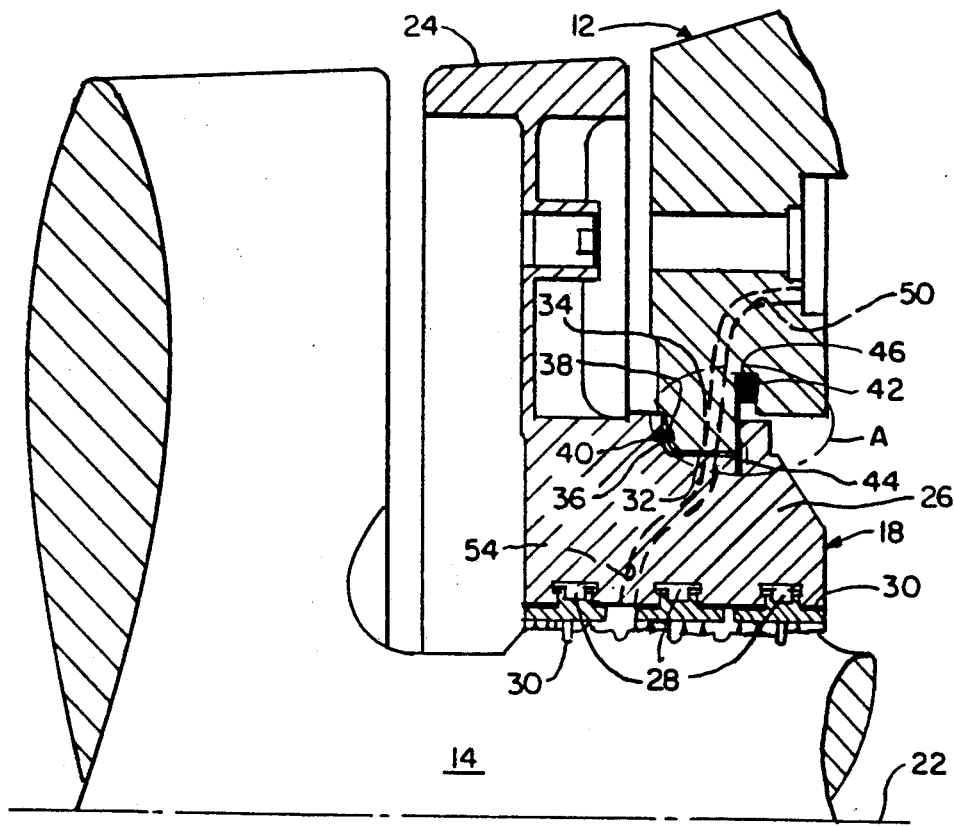
FIG. 2 is a partial cross-sectional view of the gland area of a steam turbine taken parallel to the turbine shaft.

FIG. 2 is a partial cross-section view of the gland area of a single cylinder HP turbine section of a type used in nuclear installations. The gland area is symmetrical about the axis 22 of shaft 14 so that only the upper portion of the gland area is shown. Furthermore, only the inner gland 18 is shown in this figure. The inner gland 18 includes an integral inner gland ring 24 or steam flow guide spaced axially inward of the casing 12. That portion 26 of the inner gland extending along the shaft 14 incorporates a plurality of grooves 28 which are specially adapted to receive a corresponding plurality of labyrinth type seals 30 which are closely positioned to the surface of the shaft 14 and provide a seal against steam leakage along the shaft. A larger groove 32 is formed in the outer circumference of the gland portion 26 for receiving a tongue 34 extending radially inward from the casing 12. An annular seal ring 36 is provided on the axially inward side of the tongue 34 and fits into opposed grooves 38, 40 on the tongue and inside surface of the groove 32, respectively. An annular finger seal 42 fits between the axially outer side of the tongue 34 and the adjacent side of the groove 32. This finger seal 42 does not necessarily touch the tongue 34 but is held in place in a pair of opposed grooves 44, 46 formed in the inner gland 18 and the casing 12, respectively.

In order to maintain the temperature of the casing or cylinder end wall 48 so as to minimize horizontal joint distortion, an aperture 50 is formed in the end wall and connects into the space 52 defined between the casing 12, the inner gland 18, the seal ring 36 and the finger seal 42. Superheated steam is coupled from the turbine steam lines (not shown) to the aperture 50. Another aperture 54 is formed in the inner gland 18 to provide heating of it and the adjacent portion of the shaft 14. While only one aperture in each of the cylinder end wall and inner gland are shown, it will be appreciated that apertures are provided for uniformly distributing steam in the gland area for uniform heating.

FIG. 3 is an enlarged view of the finger seal area A of FIG. 2 and better shows how the finger seal 42 is held in position. The radially outer portion 56 of the seal 42 is enlarged to allow it to be driven into the groove 46. The finger seal 42 is a metallic seal, preferably stainless steel, and additional sealing is provided by high temperature caulking 58 driven into a groove 60 in the face of the groove 46. Even with the construction of the seal 42, the erosive nature of condensate from the high temperature steam has been known to erode the supporting structure surrounding the seal 42 until steam leakage occurs around the seal.

Figure 4:
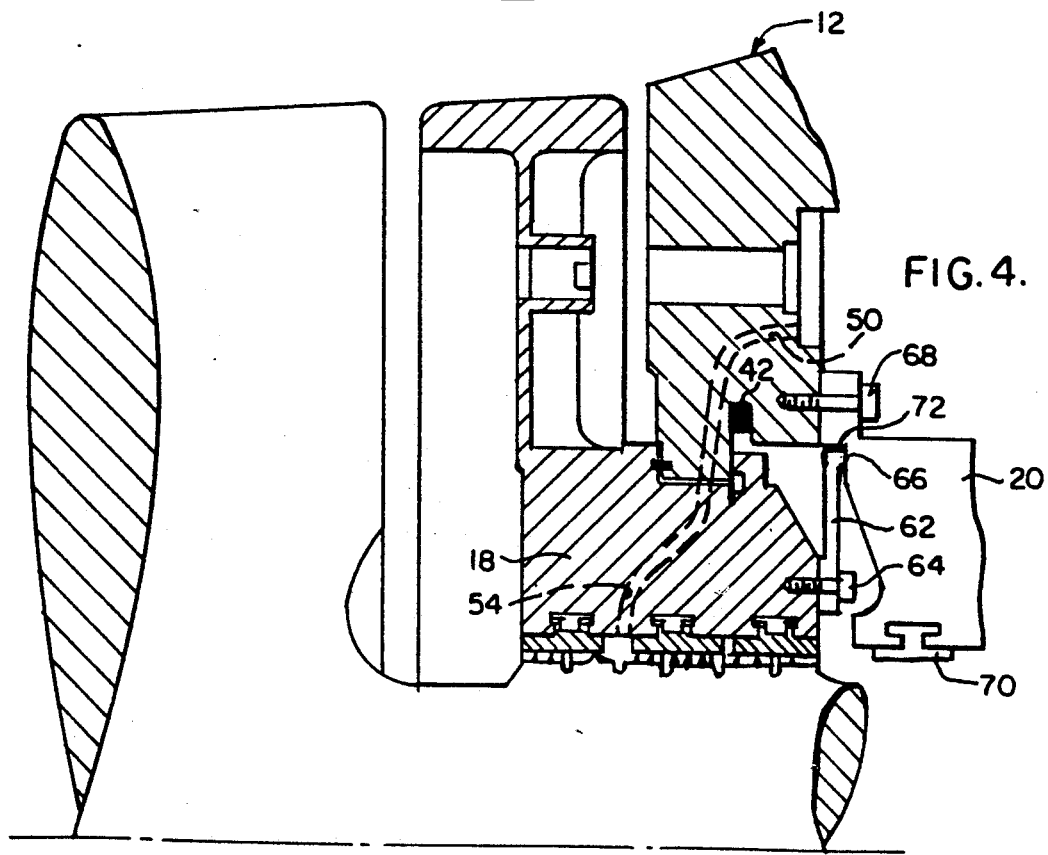
FIG. 4 is a view similar to FIG. 1 illustrating the seal arrangement of the present invention.

Turning now to FIG. 4, there is shown a seal arrangement in accordance with the present invention for minimizing steam leakage at the gland area. In this arrangement, an additional seal 62 or annular seal plate 62 is positioned between the inner gland 18 and the outer gland 20. Seal plate 62 is preferably stainless steel having a high spring constant. Seal plate 62 is attached to an outer surface of inner gland 18 by a plurality of bolts 64 surrounding the inner aperture of the seal plate 62. The radial outer portion of the seal plate 62 is cantilevered from the attachment points and positioned so as to be contacted by an inner shoulder 66 on the inner surface of the outer gland 20. The outer gland 20 is attached to the outer surface of the casing 12 by means of a plurality of bolts 68. The gland 20 at its interface with shaft 14 is substantially similar to gland 18 and includes labyrinth seals 70 at the interface. The shape of the seal plate 62 is such that it contacts the shoulder 66 prior to the outer gland 20 being seated against the casing 12. This allows the outer gland to be drawn in tight contact with the seal plate 62 as the bolts 68 are tightened. In one form, the seal plate 62 includes an outwardly directed circumferential flange 72 for contacting the shoulder 66.

It will be appreciated that all the seals and both the glands are substantially annularly uniform and that the cross-sectional views are generally representative of the shape and form of the elements throughout their circumference. However, the elements may be formed as two 180 degree sections which are attached by welding or other means when the elements are assembled to the turbine. For example, the seal plate 62 is preferably formed in two pieces and welded together after installation on the inner gland 18.

While the invention has been described in what is presently considered to be a preferred embodiment, other modifications and variations will become apparent to those skilled in the art. It is intended therefore that the invention not be limited to the illustrative embodiment but be interpreted within the full spirit and scope of the appended claims.

What is claimed is:

1. A steam turbine gland seal arrangement for use in a steam turbine having at least one casing and a shaft extending through the casing, steam being admitted into the casing for operating on blades attached to the shaft for effecting rotation thereof, an inner gland and an outer gland being provided at at least one end of the shaft where the shaft exits the casing, each of the inner and outer glands supporting seals in close proximity with the shaft for preventing steam from escaping the casing by flow along the shaft, the inner gland being supported within an aperture in the casing where the shaft exits the casing and the outer gland being attached to an outer surface of the casing surrounding the aperture, an outer cylindrical surface of the inner gland being coaxial with and radially spaced from an inner surface of the casing circumscribing the aperture, an annular finer seal being positioned between the casing and the inner gland for preventing leakage of steam from the space between the inner gland and the casing onto the outer gland, the arrangement further including an annular seal plate circumscribing the turbine shaft and having an inner radial portion sealingly attached to an outer surface of the inner gland, an outer radial portion of the annular seal plate being cantilevered from the inner attached portion and the outer radial portion extending into contact with an axially inner surface of the outer gland when the outer gland is attached to the casing, the outer gland exerting a deflecting pressure on the annular seal plate for providing a positive seal between the inner gland and the outer gland.

2. The steam turbine gland seal arrangement of claim 1 wherein the outer gland has an annular shoulder adjacent its arc of attachment to the casing, the annular seal plate contacting the outer gland along the annular shoulder.

3. The steam turbine gland seal arrangement of claim 1 wherein the annular seal plate is formed from stainless steel.

4. A method for preventing steam from entering a labyrinth seal area of an outer gland seal in a steam turbine having an inner gland seal including a plurality of labyrinth seals in proximity to a shaft of the turbine, a casing surrounding the turbine and having an annular seal ring coupling the inner gland to the casing, a steam admittance aperture being formed in the casing and connecting to a spacing between the inner gland and the casing, an annular finger seal between the inner gland and the casing spaced from the seal ring for defining a closed spacing between the seal ring and finger seal for receiving the steam from the admittance aperture, the outer gland being attached to an outer surface of the casing with its labyrinth seal area being in close proximity with a portion of the turbine shaft passing outwardly of the casing, the method comprising the steps of:

positioning an annular seal plate between the inner gland and the outer gland with the annular seal plate having an inner opening circumscribing the turbine shaft and abutting the inner gland;

attaching the annular seal plate to the inner gland adjacent the turbine shaft with its outer annular portion being cantilevered radially outward from the attachment; and attaching the outer gland to the casing with an inner shoulder abutting aganist the outer annular portion of the annular seal plate such that the annular seal plate blocks steam flow from the defined closed space to the labyrinth seal area of the outer gland.

* * * * *